United States Patent
Roberts et al.

(10) Patent No.: US 9,832,827 B2
(45) Date of Patent: Nov. 28, 2017

(54) BATTERY BACK UP LAMP USING AC WIRING ACTIVATION

(71) Applicant: GE LIGHTING SOLUTIONS, LLC, East Cleveland, OH (US)

(72) Inventors: Bruce Richard Roberts, Mentor-on-the-Lake, OH (US); Thomas Clynne, East Cleveland, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 280 days.

(21) Appl. No.: 14/938,930

(22) Filed: Nov. 12, 2015

(65) Prior Publication Data
US 2017/0142792 A1   May 18, 2017

(51) Int. Cl.
| | | |
|---|---|---|
| H05B 33/08 | (2006.01) | |
| H02J 7/00 | (2006.01) | |
| H02J 9/06 | (2006.01) | |
| H02J 9/02 | (2006.01) | |
| H05B 37/02 | (2006.01) | |

(52) U.S. Cl.
CPC ........ *H05B 33/0842* (2013.01); *H02J 7/0068* (2013.01); *H02J 9/02* (2013.01); *H02J 9/061* (2013.01); *H05B 33/0806* (2013.01); *H05B 33/0884* (2013.01); *H05B 37/0209* (2013.01)

(58) Field of Classification Search
CPC combination set(s) only.
See application file for complete search history.

(56) References Cited

U.S. PATENT DOCUMENTS

| | | |
|---|---|---|
| 6,900,595 B2 | 5/2005 | Cojocary |
| 8,415,901 B2 | 4/2013 | Recker et al. |
| 9,035,494 B2 * | 5/2015 | Mandy ............ H02J 9/00 307/64 |
| 2008/0024010 A1 | 1/2008 | Romano |

(Continued)

FOREIGN PATENT DOCUMENTS

| | | |
|---|---|---|
| WO | 2014142676 A2 | 9/2014 |
| WO | 2015003191 A2 | 1/2015 |

OTHER PUBLICATIONS

International Search Report and Written Opinion issued in connection with corresponding PCT Application No. PCT/US2016/055868 dated Dec. 21, 2016.

(Continued)

*Primary Examiner* — An Luu
(74) *Attorney, Agent, or Firm* — Peter T. DiMauro; GE Global Patent Operation

(57) ABSTRACT

A lighting device includes a secondary LED lamp assembly, a secondary power source, a first switch connecting the secondary LED lamp assembly and the secondary power source upon an absence of power from an AC mains supply, and a secondary power source return circuit from the secondary LED lamp assembly through a pre-existing second switch connected to the AC mains supply and used to control the lighting device. A method of operating a lighting device includes connecting a secondary LED lamp assembly and a secondary power source upon an absence of power from an AC mains supply, and providing a secondary power source return circuit from the secondary LED lamp assembly through a pre-existing second switch connected to the AC mains supply and used to control the lighting device.

23 Claims, 2 Drawing Sheets

(56) References Cited

U.S. PATENT DOCUMENTS

2013/0147351 A1    6/2013  Trainor et al.
2014/0265845 A1    9/2014  Williams
2016/0377246 A1*  12/2016  Simmons ................ F21S 9/024
                                                      362/20

OTHER PUBLICATIONS

Maji et al., "Storage Integrated Mains Operated LED Lamp based on Single Magnetics", Proceedings of International Conferences on Control, Communication and Power Engineering, CCPE, Advances in Engineering and Technology, vol. No. 8, pp. 854-864, Feb. 21-22, 2014.
Kickstarter, "SmartCharge™—Never be in the dark again!", https://www.kickstarter.com/projects/127019135/smartchargetm-never-be-in-the-dark-again, retrieved on Nov. 12, 2015.

* cited by examiner

BATTERY BACK UP LAMP USING AC WIRING ACTIVATION

FIELD

The disclosed exemplary embodiments relate generally to lighting systems, and more particularly to battery backed up light emitting diode (LED) lighting systems.

BACKGROUND

When power is lost, conventional lighting fixtures generally stop producing light and secondary lighting systems are energized. Secondary or emergency lighting systems generally include separate fixtures with a separate power supply and are usually controlled independently from the main lighting system.

LED technology continues to advance resulting in improved efficiencies and lower costs with LEDs found in lighting applications ranging from small pin point sources to stadium lights. An LED light source may typically produce 90-150 lumens per watt (LPW) and may be adapted for battery backup. However, many of the currently available solutions use a large number of additional components, impedance sensing circuitry, and control circuitry to provide light in the event a primary power supply, such as the AC mains, is lost. It would be advantageous to provide structures and techniques for providing light from an LED light source during a power failure that overcome these and other disadvantages of the present art.

SUMMARY

In at least one exemplary embodiment, a lighting device includes a secondary LED lamp assembly, a secondary power source, a first switch connecting the secondary LED lamp assembly and the secondary power source upon an absence of power from an AC mains supply, and a secondary power source return circuit from the secondary LED lamp assembly through a pre-existing second switch connected to the AC mains supply and used to control the lighting device.

The lighting device may include a charging circuit in series with the secondary power source and the AC mains supply.

The secondary LED lamp assembly may include one or more secondary LEDs having a color temperature of approximately 5000-6500° K.

The lighting device may include a primary light source connected to the AC mains supply.

The primary light source may include a power supply for driving a primary LED lamp assembly.

The power supply may include an output connected to the first switch that causes the first switch to disconnect the secondary lamp assembly and the secondary power source upon receiving power from the AC mains supply.

The primary LED lamp assembly may include one or more primary LEDs having a color temperature of approximately 2000-3000° K.

A color temperature of light emitted by the lighting device may indicate whether the lighting device is powered by the AC mains supply or the secondary power source.

The exemplary embodiments are also directed to a method of operating a lighting device including connecting a secondary LED lamp assembly and a secondary power source upon an absence of power from an AC mains supply, and providing a secondary power source return circuit from the secondary LED lamp assembly through a pre-existing second switch connected to the AC mains supply and used to control the lighting device.

The method may include comprising charging the secondary power source with a charging circuit in series with the secondary power source and the AC mains supply.

The secondary LED lamp assembly may include one or more secondary LEDs having a color temperature of approximately 5000-6500° K.

The method may include disconnecting the secondary LED lamp assembly and the secondary power source upon receiving power from the AC mains supply.

The method may include providing the received power to a primary light source.

The method may include using a power supply of the primary light source to drive a switch for connecting and disconnecting the secondary LED lamp assembly and secondary power source.

The method may include using a power supply of the primary light source to drive a primary LED lamp assembly.

The primary LED lamp assembly may include one or more primary LEDs having a color temperature of approximately 2000-3000° K.

The method may include using a color temperature of light emitted by the lighting device to indicate whether the lighting device is powered by the AC mains supply or the secondary power source.

The exemplary embodiments are further directed to a lighting device including a primary light source comprising a power supply and a primary LED lamp assembly, a secondary light source comprising a secondary power source and a secondary LED lamp assembly, a first switch controlled by an output of the power supply to connect the secondary LED lamp assembly and the secondary power source upon an absence of power from an AC mains supply, and a secondary power source return circuit from the secondary LED lamp assembly through a pre-existing second switch connected to the AC mains supply and used to control the lighting device.

The lighting device may include a charging circuit in series with the secondary power source and the AC mains supply.

The first switch may be further controlled by the power supply output to disconnect the secondary LED lamp assembly and the secondary power source upon receiving power from the AC mains supply.

The primary LED lamp assembly may include one or more primary LEDs having a color temperature of approximately 2000-3000° K.

The secondary LED lamp assembly may include one or more secondary LEDs having a color temperature of approximately 5000-6500° K.

A color temperature of light emitted by the lighting device may indicate whether the lighting device is powered by the AC mains supply or the secondary power source.

BRIEF DESCRIPTION OF THE DRAWINGS

The foregoing and other aspects of the disclosed embodiments are made more evident in the following Detailed Description, when read in conjunction with the attached Drawing Figures, wherein.

DETAILED DESCRIPTION

Figure 1:
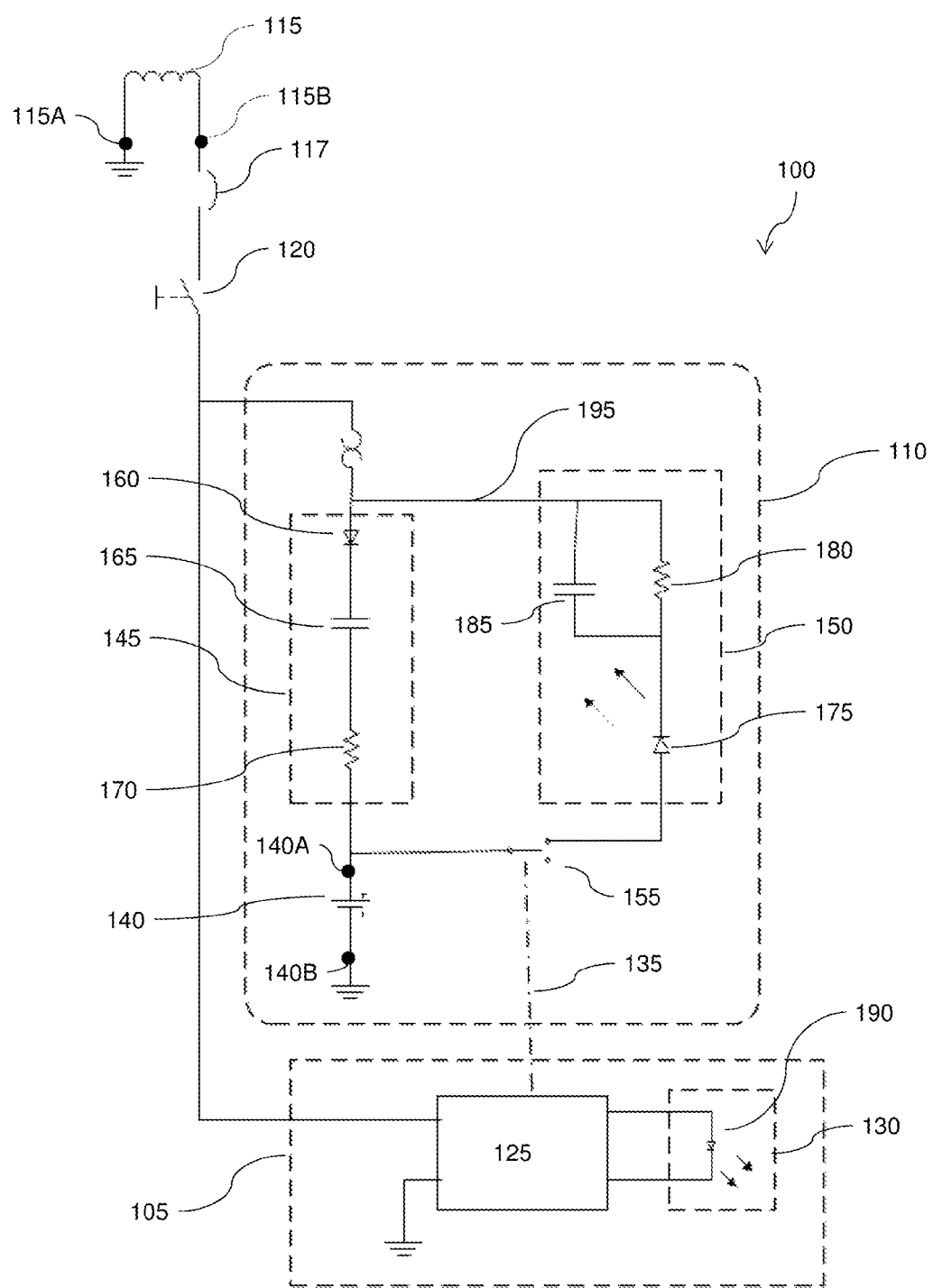
FIG. 1 shows a schematic diagram of a lighting device according to the disclosed embodiments.

FIG. 1 shows a block diagram of a lighting device 100 according to the disclosed embodiments. The lighting device includes a primary light source 105 and a secondary light source 110 connected to an AC mains supply 115. A phase signal 115A of the AC mains supply 115 may be connected to the lighting device 100 optionally through a circuit breaker 117 and through a switch 120. The lighting device may be directly connected to a neutral signal 115B of the AC mains supply 115. Switch 120 may be a conventional wall switch or other device for controlling a light source. The primary light source 105 may include a power supply 125 connected to the AC mains supply 115 through the switch 120 that provides an output for driving a primary LED lamp assembly 130. Another output 135 of the power supply 125 is used to control the secondary light source 110.

The secondary light source 110 includes a secondary power source 140, a charging circuit 145, a secondary LED lamp assembly 150 and a switch 155. The secondary power source 140 is generally a DC power source and may be a battery, capacitor, or other DC storage device. The charging circuit 145 is connected in series between the AC mains supply phase signal 115A and a positive terminal 140A of the secondary power source 140 and operates to charge the secondary power source 140 when power is available from the AC mains supply 115. The charging circuit 145 may include a diode 160 for rectifying voltage and current from the AC mains supply 115 and a capacitor 165 for isolating the secondary power source 140 from the AC mains supply 115. A series resistor 170 may serve to limit voltage and current applied to the secondary power source 140. The charging circuit 145 may be referred to as a trickle charger. A negative terminal 140B of the secondary power source 140 may be connected the neutral terminal 115B of the AC power source 115. In addition to the charging circuit 145, the positive terminal 140A of the secondary power source 140 may also be connected to the secondary LED lamp assembly 150 through the switch 155. The switch 155 may be any suitable device for switching current, including a bipolar junction transistor, or field effect transistor. In at least one embodiment, switch 155 may be a normally closed relay.

The secondary LED lamp assembly 150 may include one or more secondary LEDs 175 in series with a resistor 180-capacitor 185 combination for limiting and filtering current through the secondary LEDs 175. Individual LEDs of the secondary LED lamp assembly 150 may be connected together in series, parallel, or any combination of series and parallel.

The primary LED lamp assembly 130 may include one or more primary LEDs 190 and individual primary LEDs of the primary LED lamp assembly 130 may be connected together in series, parallel, or any combination of series and parallel. In some embodiments the primary LEDs 190 may have an effective color temperature that is lower than the secondary LEDs 175. For example, the primary LEDs 190 may have an effective color temperature of approximately 2000-3000° K. Individual ones of the primary LEDs 190 may have different color temperatures so long as the effective color temperature of the primary LEDs 190 as a group is lower than the effective color temperature of the secondary LEDs 175.

Correspondingly, in one or more embodiments the secondary LEDs 175 may have an effective color temperature that is higher than the primary LEDs 180. For example, the secondary LEDs 175 may have an effective color temperature of 5000-6500° K. Individual ones of the secondary LEDs may have different color temperatures so long as the effective color temperature of the secondary LEDs 175 as a group is higher than the effective color temperature of the primary LEDs 190. A higher effective color temperature may result in a more efficient conversion of electrical power to light, allowing the secondary LEDs 175 to provide more lumens per watt.

When AC power from the AC power source 115 is available and the switch 120 is closed and conducting, the primary light source 105 operates in a normal manner where the power supply 125 provides an output that drives primary LED lamp assembly 130. According to the disclosed embodiments, the power supply 125 also provides an output 135 connected to switch 155 causing switch 155 to remain open. In addition, the charging circuit 145 operates to charge the secondary power source 140.

When the switch 120 is open and non-conducting, power is no longer provided to the power supply 125, the power supply 125 stops driving the primary LED lamp assembly 130, and the primary LED lamp assembly 130 stops emitting light. The power supply 125 also stops providing the output 135 to switch 155, causing switch 155 to close and provide a connection between the secondary power source 140 and the secondary LEDs 175. Because switch 120 is open, there is no return path or connection to the neutral conductor 115B to provide a current flow through the secondary LEDs 175. As a result, the lighting device 100 extinguishes.

When switch 120 is closed and AC power from the AC power source 115 is lost, the power supply 125 no longer drives the primary LED lamp assembly 130 causing the primary LEDs 190 to extinguish. Also, the power supply 125 no longer provides output 135 to switch 155 causing switch 155 to close and conduct. Because switch 120 is closed and conducting, power from the secondary power source 140 is provided from the secondary power source 140 through switch 155, secondary LEDs 175, and resistor 180, and through a secondary power source return circuit 195 through switch 120 to the neutral conductor 115B. As a result, the secondary LEDs 175 are energized and produce light. While AC power from the AC power source 115 is lost, switch 120 may be used to control the secondary LEDs 175 by establishing the electrical path 195 when closed and interrupting the electrical path 195 when open. As a result, control of the lighting device 100 is provided by switch 120 when AC power from the AC power source 115 is present and when AC power from the AC power source 115 is absent.

The color temperature of light emitted by the lighting device 100 may indicate whether the lighting device 100 is operating under AC power or is being powered by the secondary power source 140. In embodiments where the secondary LEDs 175 have an effective color temperature that is distinguishable from the effective color temperature of the primary LEDs 190, AC or secondary power source operation may be identified by the color of the light emitted by the lighting device 100. For example, as stated above, the secondary LEDs 175 may have an effective color temperature of approximately 5000-6500° K which may be visually distinguishable from the effective color temperature of the primary LEDs 190 at approximately 2000-3000° K.

Figure 2:
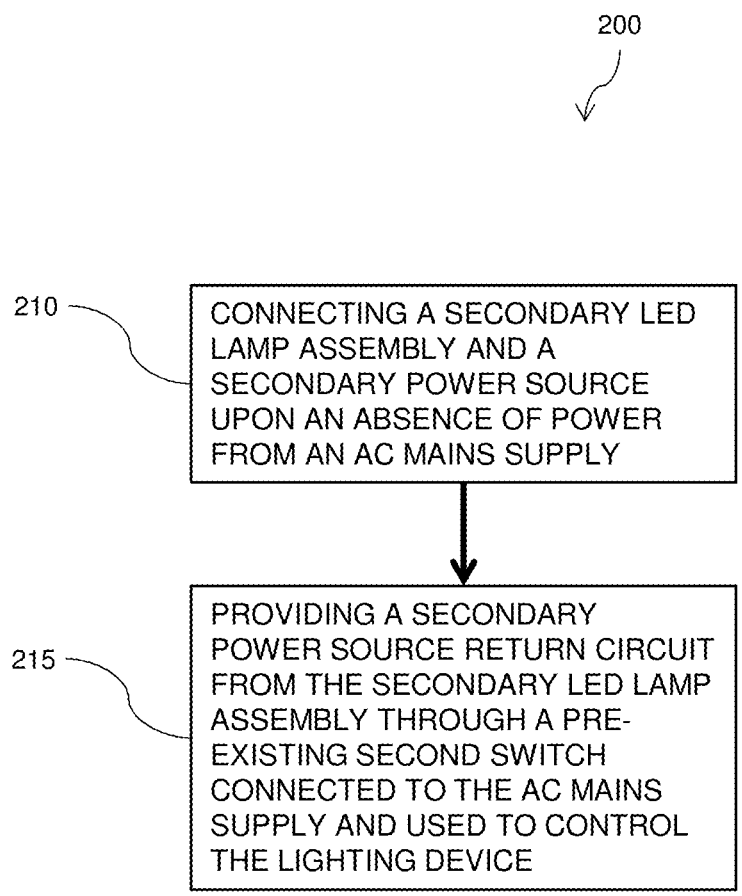
FIG. 2 shows a block diagram of a method according to the disclosed embodiments.

FIG. 2 shows a method 200 according to the disclosed embodiments. In block 210 the method includes connecting a secondary LED lamp assembly and a secondary power source upon an absence of power from an AC mains supply. In block 215, the method includes providing a secondary power source return circuit from the secondary LED lamp assembly through a pre-existing second switch connected to the AC mains supply and used to control the lighting device.

The embodiments disclosed herein utilize a secondary light source 110 to provide light in the event that AC mains power is lost. A secondary power source is charged while the AC mains supply is present, and during a power failure is connected to secondary LEDs having a different color temperature than a primary light source. The secondary LEDs have a return power path through existing wiring to a same switch used to control the light source when the AC mains supply is present. The end result is a secondary lighting source 110 that is controllable by the existing wiring infrastructure in a predictable manner while providing a visual indication that the secondary lighting source is operational. Operation of the primary light source 105 is unaffected and the primary light source 105 operates as designed, both when the AC mains supply is available and when the AC mains supply is lost. Thus, the secondary lighting source 110 may be added to an existing LED bulb for providing additional functionality without affecting normal operation.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. A lighting device comprising:
a secondary LED lamp assembly;
a secondary power source;
a first switch connecting the secondary LED lamp assembly and the secondary power source upon an absence of power from an AC mains supply; and
a secondary power source return circuit from the secondary LED lamp assembly through a pre-existing second switch connected to the AC mains supply and used to control the lighting device.

2. The lighting device of claim 1, comprising a charging circuit in series with the secondary power source and the AC mains supply.

3. The lighting device of claim 1, wherein the secondary LED lamp assembly comprises one or more secondary LEDs having a color temperature of approximately 5000 K-6500 K.

4. The lighting device of claim 1, comprising a primary light source connected to the AC mains supply.

5. The lighting device of claim 4, wherein the primary light source comprises a power supply for driving a primary LED lamp assembly.

6. The lighting device of claim 5, wherein the power supply comprises an output connected to the first switch that causes the first switch to disconnect the secondary lamp assembly and the secondary power source upon receiving power from the AC mains supply.

7. The lighting device of claim 5, wherein the primary LED lamp assembly comprises one or more primary LEDs having a color temperature of approximately 2000 K-3000 K.

8. The lighting device of claim 7, wherein a color temperature of light emitted by the lighting device indicates whether the lighting device is powered by the AC mains supply or the secondary power source.

9. A method of operating a lighting device comprising:
connecting a secondary LED lamp assembly and a secondary power source upon an absence of power from an AC mains supply; and
providing a secondary power source return circuit from the secondary LED lamp assembly through a pre-existing second switch connected to the AC mains supply and used to control the lighting device.

10. The method of claim 9, comprising charging the secondary power source with a charging circuit in series with the secondary power source and the AC mains supply.

11. The method of claim 9, wherein the secondary LED lamp assembly comprises one or more secondary LEDs having a color temperature of approximately 5000 K-6500 K.

12. The method of claim 9, comprising disconnecting the secondary LED lamp assembly and the secondary power source upon receiving power from the AC mains supply.

13. The method of claim 12, comprising providing the received power to a primary light source.

14. The method of claim 13, comprising using a power supply of the primary light source to drive a switch for connecting and disconnecting the secondary LED lamp assembly and secondary power source.

15. The method of claim 13, comprising using a power supply of the primary light source to drive a primary LED lamp assembly.

16. The method of claim 15, wherein the primary LED lamp assembly comprises one or more primary LEDs having a color temperature of approximately 2000 K-3000 K.

17. The method of claim 16, comprising using a color temperature of light emitted by the lighting device to indicate whether the lighting device is powered by the AC mains supply or the secondary power source.

18. A lighting device comprising:
a primary light source comprising a power supply and a primary LED lamp assembly;
a secondary light source comprising a secondary power source and a secondary LED lamp assembly;
a first switch controlled by an output of the power supply to connect the secondary LED lamp assembly and the secondary power source upon an absence of power from an AC mains supply; and
a secondary power source return circuit from the secondary LED lamp assembly through a pre-existing second switch connected to the AC mains supply and used to control the lighting device.

19. The lighting device of claim 18, comprising a charging circuit in series with the secondary power source and the AC mains supply.

20. The lighting device of claim 18, wherein the first switch is further controlled by the power supply output to disconnect the secondary LED lamp assembly and the secondary power source upon receiving power from the AC mains supply.

21. The lighting device of claim 18, wherein the primary LED lamp assembly comprises one or more primary LEDs having a color temperature of approximately 2000 K-3000 K.

22. The lighting device of claim 18 wherein the secondary LED lamp assembly comprises one or more secondary LEDs having a color temperature of approximately 5000 K-6500 K.

23. The lighting device of claim 22, wherein a color temperature of light emitted by the lighting device indicates whether the lighting device is powered by the AC mains supply or the secondary power source.

* * * * *